United States Patent
Broussard

(10) Patent No.: US 9,403,108 B2
(45) Date of Patent: Aug. 2, 2016

(54) FILTRATION OPERATOR

(71) Applicant: Global Splash, Inc., Pineville, LA (US)

(72) Inventor: Ronney L. Broussard, Pollock, LA (US)

(73) Assignee: GLOBAL SPLASH, INC., Pineville, LA (US)

( * ) Notice: Subject to any disclaimer, the term of this patent is extended or adjusted under 35 U.S.C. 154(b) by 0 days.

(21) Appl. No.: 14/168,964

(22) Filed: Jan. 30, 2014

(65) Prior Publication Data

US 2015/0258474 A1 Sep. 17, 2015

Related U.S. Application Data

(63) Continuation of application No. 13/349,475, filed on Jan. 12, 2012, now abandoned.

(51) Int. Cl.
| | |
|---|---|
| *B01D 24/46* | (2006.01) |
| *B01D 29/68* | (2006.01) |
| *B01D 29/52* | (2006.01) |
| *B01D 35/26* | (2006.01) |
| *B01D 35/05* | (2006.01) |
| *B01D 24/00* | (2006.01) |
| *B01D 39/06* | (2006.01) |

(52) U.S. Cl.
CPC .............. *B01D 29/68* (2013.01); *B01D 24/005* (2013.01); *B01D 24/4631* (2013.01); *B01D 29/52* (2013.01); *B01D 35/05* (2013.01); *B01D 35/26* (2013.01); *B01D 39/06* (2013.01); *B01D 2201/50* (2013.01); *Y02W 10/15* (2015.05)

(58) Field of Classification Search
CPC .... B01D 24/002; B01D 24/005; B01D 24/04; B01D 24/245; B01D 24/4631; B01D 24/4642; B01D 39/06; B01D 2201/50; B01D 2239/02; B01D 2239/0241; B01D 24/24

USPC .............. 210/243, 274, 275, 277, 278, 286, 210/500.1, 503
See application file for complete search history.

(56) References Cited

U.S. PATENT DOCUMENTS

| | | | | |
|---|---|---|---|---|
| 1,686,558 | A | | 10/1928 | Hall |
| 2,748,077 | A | | 10/1952 | Hodan et al. |
| 3,870,633 | A | * | 3/1975 | Setterstrom ............ B01D 23/00 210/275 |
| 4,028,241 | A | * | 6/1977 | Davis ................... B01J 49/0086 210/275 |
| 4,986,906 | A | * | 1/1991 | Dadisman ............. C02F 1/4606 210/243 |
| 5,230,807 | A | * | 7/1993 | Kozlowski, II ..... C02F 1/46104 210/243 |
| 5,248,415 | A | * | 9/1993 | Masuda ............... B01D 24/002 210/275 |
| 5,505,844 | A | * | 4/1996 | Porter ................. B01D 24/4642 210/278 |
| 6,790,345 | B2 | * | 9/2004 | Broussard ............ B01D 24/008 210/274 |
| 7,648,630 | B2 | * | 1/2010 | Broussard ............... C02F 1/001 210/274 |
| 2006/0213833 | A1 | | 9/2006 | Kando et al. |
| 2009/0294356 | A1 | * | 12/2009 | Beggs ................ B01D 24/4631 210/275 |
| 2013/0180904 | A1 | | 7/2013 | Broussard |

* cited by examiner

*Primary Examiner* — Christopher Upton
(74) *Attorney, Agent, or Firm* — Robert Becker; Berenbaum Weinshienk PC

(57) ABSTRACT

A filtration operator for filtering raw water, comprising a plurality of filtration units, a raw water reservoir, a conduit for conveying raw water from the raw water reservoir to individual ones of the filtration units, filter medium provided in each of the filtration units for filtering raw water, a respective raw water chamber configured to be in water communication with the raw water reservoir, the filtration units, and a pump chamber, a sludge filtering and recycling chamber for receiving sludge from the filtration units during a backwash cycle, and at least one positively charged bar disposed in each of the raw water chambers, as well as in a sludge receiving chamber associated with the sludge filtering and recycling chamber.

12 Claims, 15 Drawing Sheets

FILTRATION OPERATOR

The present application is a CIP application of Ser. No. 13/349,475 which was filed with the United States Patent Office on Jan. 12, 2012.

BACKGROUND OF THE INVENTION

Field of the Invention

This invention relates to water filters and more particularly, to a filtration system or operator which can be floated on, or be disposed externally of, a water body to filter and disinfect water from the water body for drinking or other purposes. The filtration operator includes multiple filtration units which receive raw water, each of which filtration units includes at least one element or medium, for filtering the water. A pump is provided in the housing for pumping the filtered water to a suitable container or dispenser or to a reverse-osmosis filtration unit for further filtration, and a positive electrical charge may be applied to the housing in conjunction with the introduction of forced air into a raw water chamber, to neutralize negatively charged impurities in the raw incoming water flowing through the filter media and improve filtration efficiency.

Treatment processes for filtering surface water have remained virtually unchanged for over half a century. Many surface water treatment plants utilize large settling basins, known as clarifiers, to settle out heavy solids from water prior to fine-screening the water, using rapid sand filters. Some of these treatment plants use a mixing chamber clarifier to separate the heavy solids from the water. Such a mixing chamber clarifier requires the introduction of polymers, lime, alum or other types of media into the water to be treated, which media bind particulate impurities in the water and fall with the bound impurities to the bottom of the mixing chamber. The filtered water, substantially devoid of the larger impurities, is then typically processed through horizontal sand filters which remove smaller impurities from the water. The sand filters must be periodically backwashed using large quantities of clean water because they repeatedly become clogged with the smaller particles that were not removed from the water during the clarification process. The fewer the particles removed during the clarification process, the more often the backwashing procedure must be repeated.

The foregoing types of surface water treatment plants are associated with many problems due to the nature of their operation. Numerous pumps and an expensive and elaborate intake structure must be installed in the water supplies to conduct the water to the plants for treatment. Another problem involves the disposal of solids that are removed from the water. Formerly, these solids, along with the chlorine, polymers, lime or other particulate binding media, were pumped back into the pre-filtered water from which they were removed. Due to recent environmental legislation, however, it is no longer lawful to discharge the particulate binding media into the pre-filtered water supply, as these materials are not endemic to the water that is being treated. Another problem associated with these filtration systems is that the polymers or other particle binding media introduced into the filtration system are harmful to certain types of boiler water industrial filtration equipment which utilizes reverse osmosis. This increases the cost of boiler water for industrial consumers. Furthermore, disinfectant chemicals introduced into the filtered water do not always kill all parasites found in water sources. Moreover, rapid sand filters cannot remove all of these parasites, some of which remain in the water and present a potentially dangerous health risk. Another problem associated with these surface water treatment plants is the inability to remove harmful chemicals which may contaminate the water supply by agricultural run-off or accidental spills. Accordingly, surface treatment plants can be costly and time-consuming to build and maintain.

A number of different types of filters are known in the art for filtering surface water. Patents of interest in this regard include U.S. Pat. No. 4,606,819, issued Aug. 19, 1986, to Colson; U.S. Pat. No. 4,643,836, issued Feb. 17, 1987, to Schmid; U.S. Pat. No. 4,657,672, issued Apr. 14, 1987, to Allen; U.S. Pat. No. 4,950,393, issued Aug. 21, 1990, to Goettl; U.S. Pat. No. 5,160,039, issued Nov. 3, 1992, to Colburn; U.S. Pat. No. 5,549,828, issued Aug. 27, 1996, to Ehrlich; and U.S. Pat. No. 6,027,639, issued Feb. 22, 2000, to J. Lenhart et al. My U.S. Pat. No. 6,790,345, issued Sep. 14, 2004, and U.S. Pat. No. 7,648,630, issued Jan. 19, 2010, detail underwater filtration operators for floating on a water body and producing clarified water from the water body.

SUMMARY OF THE INVENTION

These and other objects of the invention are realized by a filtration system or operator for filtering water from a water body, such as a lake, river, pond or other water body. The filtration system includes filtration units, each of which includes at least one filter element or medium for filtering water from the water body. A pump is provided in the housing interior for receiving the filtered water from all or selected ones of the filtration units and pumping the filtered water to facilitate back-washing of individual filtration compartments or to a suitable collection facility or dispenser, or to a reverse osmosis filter for further treatment. Selected ones or all of the units may be backwashed at any time to clean the filter element(s) while the remaining units remain on-line in the filtration process. Water to be filtered may be positively charged with electricity in the raw water chambers of the operator, in conjunction with the introduction of forced air into the raw water chamber, to neutralize negatively charged impurities flowing through the filter media with the raw entry water and enhance the filtration efficiency.

BRIEF DESCRIPTION OF THE DRAWINGS

The invention will be better understood by reference to the accompanying drawings, wherein.

DESCRIPTION OF THE PREFERRED EMBODIMENTS

Figure 1:
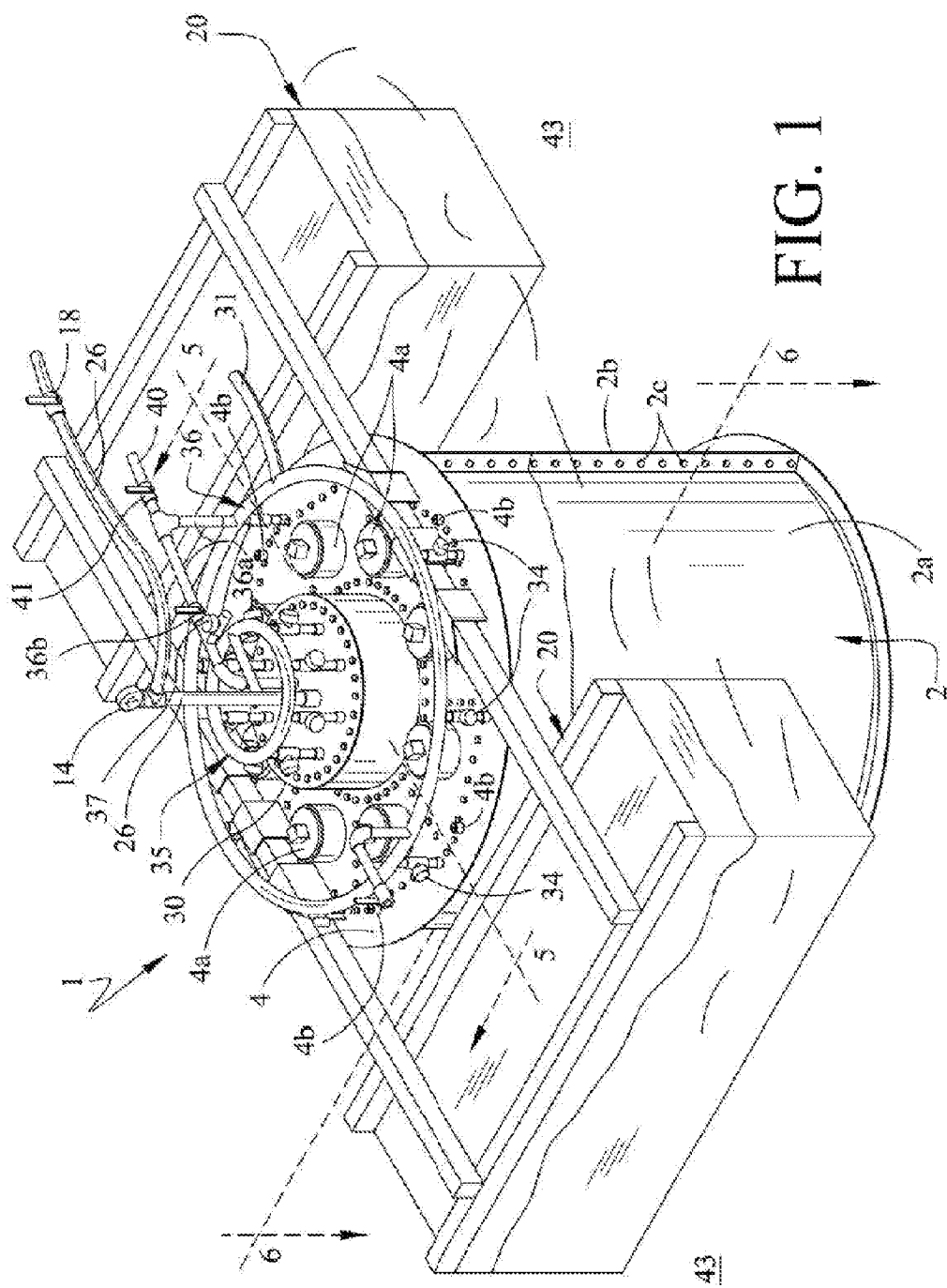
FIG. 1 is a perspective view of a first illustrative embodiment of an underwater filtration system of this invention having a flotation collar for floating the device on a water body.
Figure 2:
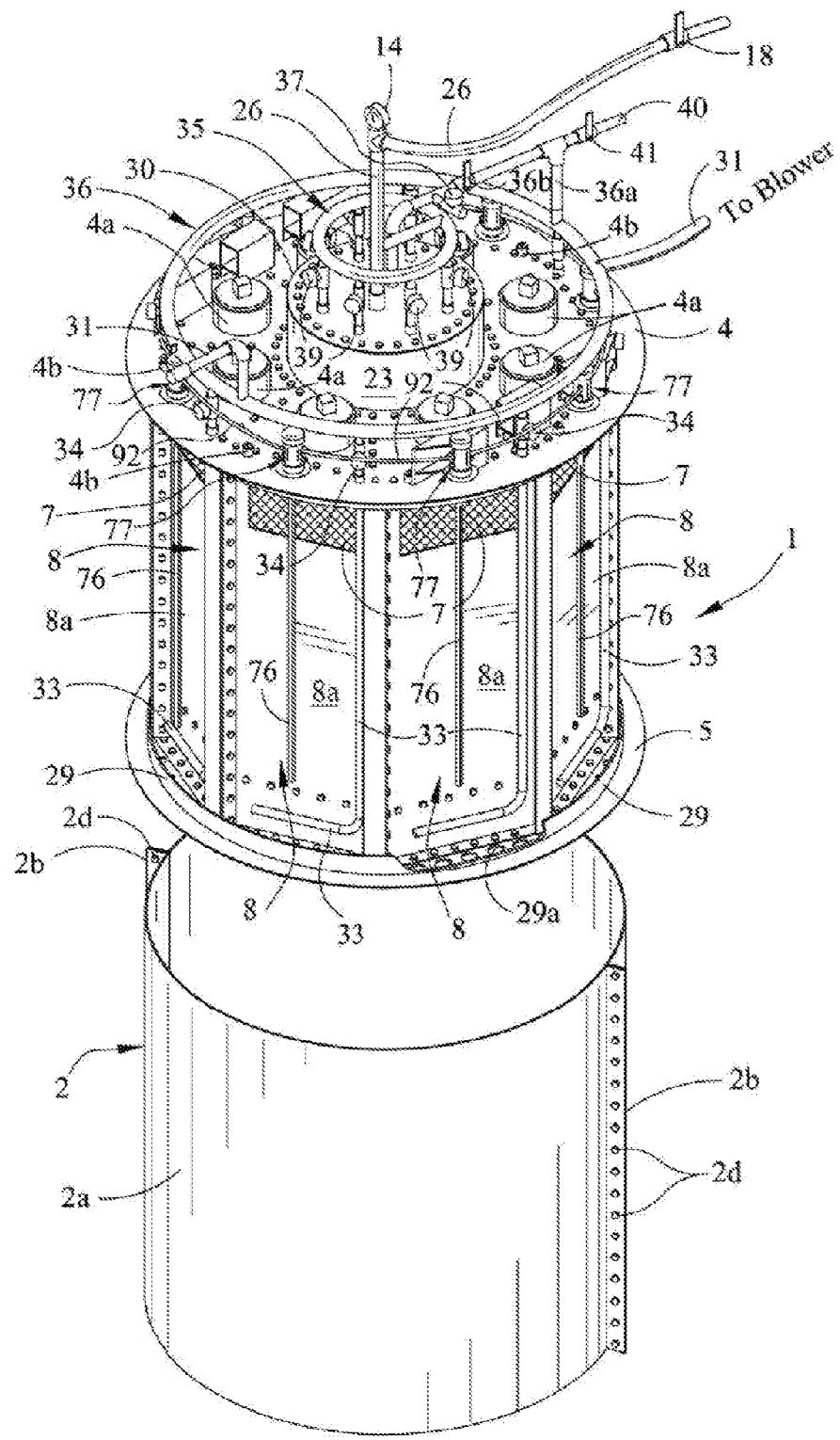
FIG. 2 is a perspective view, with the housing element removed, of the underwater filtration system illustrated in FIG. 1.

Referring initially to FIGS. 1-6 of the drawings, an illustrative embodiment of an underwater filtration system or operator of this invention is generally illustrated by reference numeral 1. The underwater filtration operator 1 is designed for flotation or otherwise positioning in a water body 43 (FIG. 1), such as a river, pond or lake to filter, clarify and selectively disinfect water from the water body 43 for drinking, additional processing or other purposes, as hereinafter described. A housing flotation collar 20, typically constructed of an expanded foam material such as STYROFOAM (trademark) or other suitable buoyant material, or alternatively, having an inner flotation chamber (not illustrated), may be mounted on the top housing panel 4 to impart buoyancy to the underwater filtration operator 1 in a water body 43, as illustrated in FIG. 1 and hereinafter described. In a first preferred embodiment, the underwater filtration operator 1 includes a split housing 2 which, as illustrated in FIGS. 1 and 2, can typically be cylindrical, and is typically shaped by a pair of half cylinders 2a, joined at diametrically-opposed cylinder flanges 2b, having flange bolt holes 2d (FIG. 2) for receiving flange bolts 2c, illustrated in FIG. 1 and cooperating nuts (not illustrated). The housing 2 is closed at the top by an oversized top housing panel 4, and an oversized bottom housing panel 5 (FIG. 2) closes the housing 2 at the bottom. The housing 2 encloses multiple filtration units 8 (FIG. 2), which are pie-shaped and separated from each other in the housing 2 by partitions 6 (FIGS. 3 and 4), which extend inwardly from the housing 2 to a pump housing 23 and between the top housing panel 4 and the bottom housing panel 5. While the embodiment of the underwater filtration operator 1 illustrated in the drawings typically includes eight filtration units 8, it is understood that any number of filtration units 8 can be contained in a housing 2 of any desired size and shape. As illustrated in FIGS. 1 to 8, each filtration unit 8 is fitted with an air vent opening 4b and typically includes an outermost, annular raw water chamber 17, defined by the housing 2 and each respective filtration unit cover 8a, which closes the corresponding filtration units 8. Each of the filtration unit covers 8a has a filtration screen 7 on the top thereof for receiving raw water from the raw water chamber 17 as hereinafter further described. Each of the filtration screen covers 8a is also mounted on a corresponding pie-shaped screen grid frame 12 at the bottom thereof and to a top flange 3 mounted on the top housing panel 4 and mounted to the bottom housing panel 5 (FIG. 5), using bolts (not illustrated). As hereinafter further described, the filtration units 8 each contain a selected top filter medium 13, such as coal or charcoal, for example, and a selected bottom filter medium 13a, such as, for example, sand. It will be appreciated by those skilled in the art that the filtration units 8 can be any desired size to contain any desired volume of any selected filter medium, including sand, charcoal, or the like, in non-exclusive particular, depending on the degree of filtration desired. Each of the filtration units 8 is designed to contain the selected particulate top filter medium 13 and/or the bottom filter medium 13a, in selected quantities, respectively.

Figure 3:
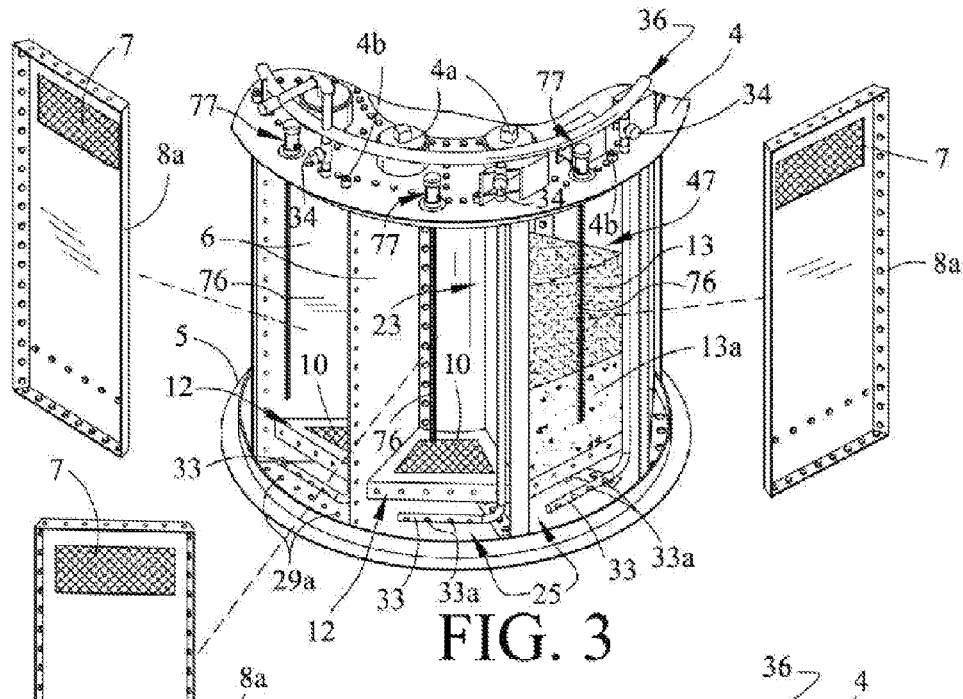
FIG. 3 is an exploded perspective view of the underwater filtration system illustrated in FIGS. 1 and 2, illustrating typical filtration unit cover elements and filtration units of the underwater filtration operator.
Figure 4:
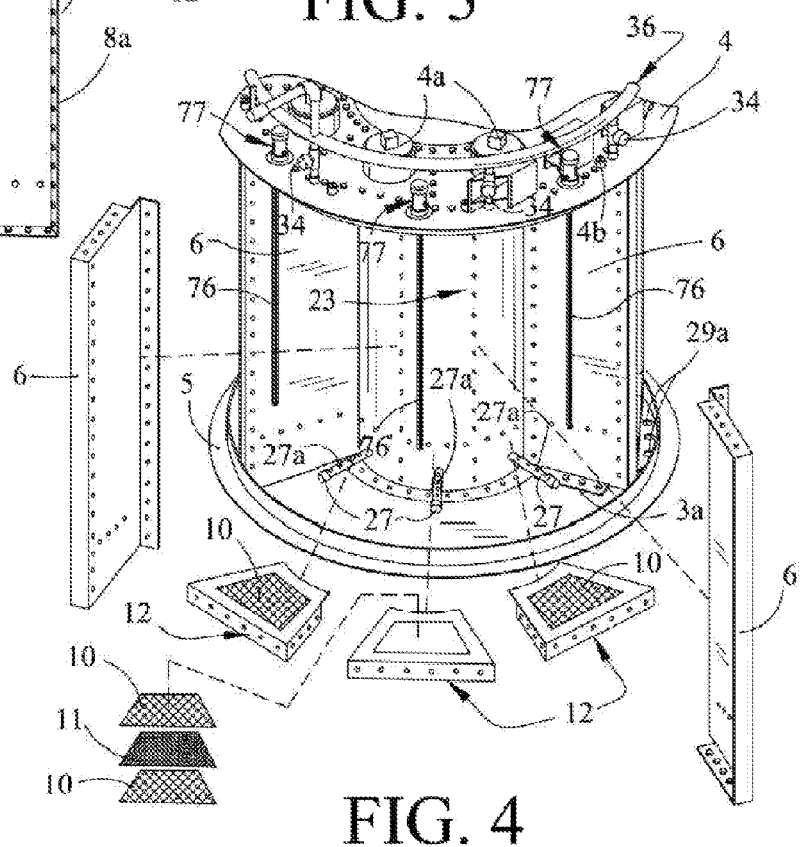
FIG. 4 is an exploded perspective view of the system illustrated in FIG. 3, more particularly illustrating filtration unit screen grid frames and screens in the underwater filtration system.

As illustrated in FIGS. 3 and 4, each of the pie-shaped screen grid frames 12 forms the bottom of a filtration unit 8 and typically includes a sieve screen 11, sandwiched between a pair of expanded metal screens 10 (FIG. 4). The screen openings of each sieve screen 11 are smaller in size than the particles of the top filter medium 13 or bottom filter medium 13a, respectively, to prevent inadvertent movement of the top filter medium 13 and bottom filter medium 13a downwardly, beyond the confines of the respective filtration units 8. As further illustrated in FIGS. 7 and 8, an air space 47 is defined between the bottom surface of the top housing panel 4 and the top filter medium 13 in the respective filtration units 8, to compensate for media expansion during the filter medium backwash cycles. As illustrated in FIGS. 1-5, 6 and 7, access caps 4a are typically provided to close corresponding openings (not illustrated) for accessing the respective filtration units 8 as necessary and changing or adding to the top filter medium 13 and/or the bottom filter medium 13a, respectively. The access caps 4a are typically threaded onto correspondingly-threaded receiving rings (not illustrated) provided on the top housing panel 4.

Figures 5, 6:
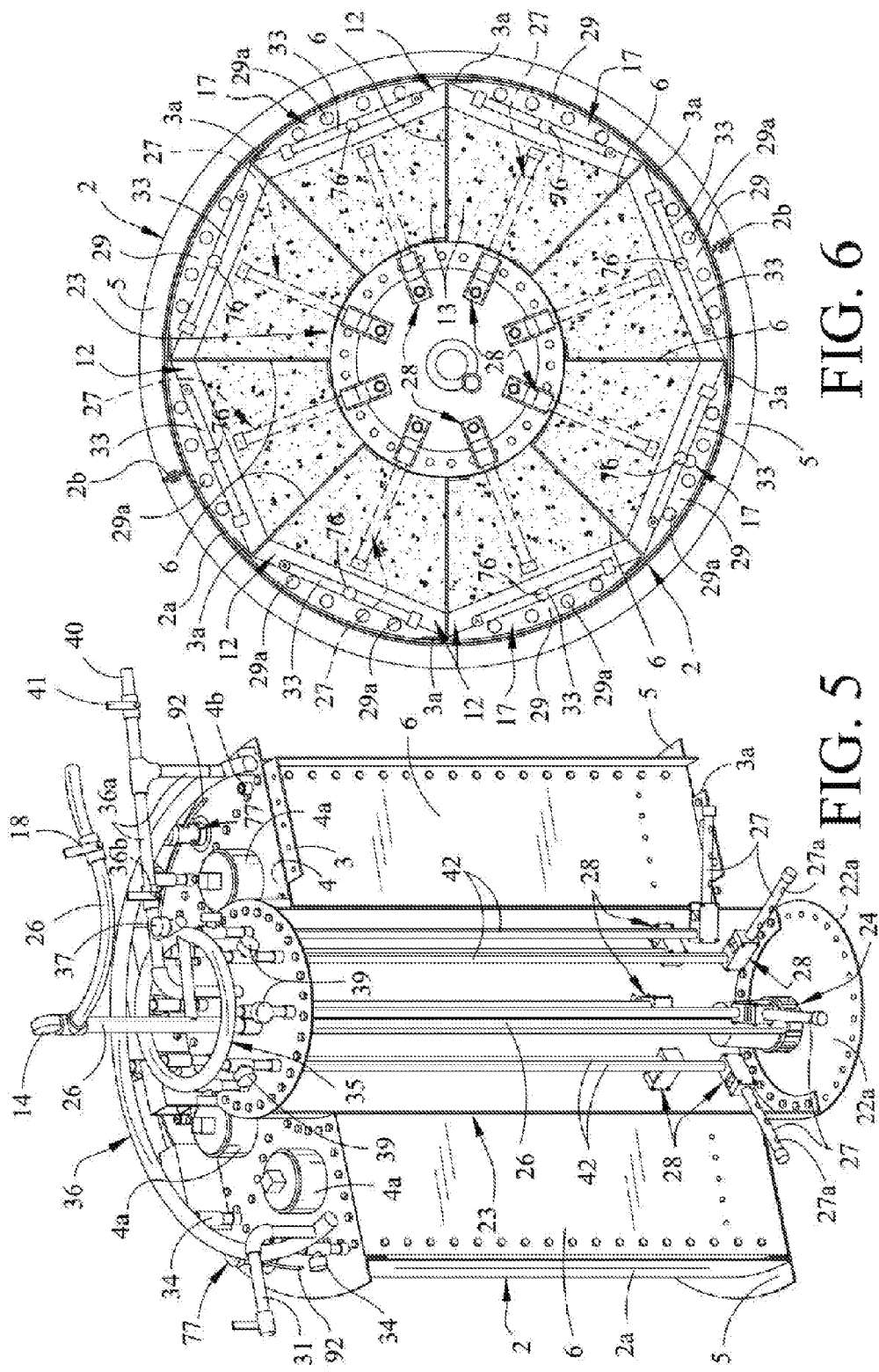
FIG. 5 is a sectional view, taken along section lines 5-5 in FIG. 1, of the underwater filtration operator.
FIG. 6 is a sectional view, taken along section lines 6-6 in FIG. 1, of the underwater filtration operator.

Referring again to FIGS. 5-7 of the drawings, each filtration unit 8 rests on a screen grid frame 12 and lies adjacent to a vertical pump chamber 16, defined by a pump housing 23, typically provided in the center of the housing 2. The pump housing 23 is typically characterized by a pump housing pipe 22 of selected size which extends upwardly from a pump housing bottom cover plate 22a. Multiple diffuser pipes 27 are located in the respective diffuser pipe chambers 25 and project from corresponding 3-way diverters 28 located in the pump chamber 16, into the respective filtration units 8 beneath screen grid frame 12 to establish water communication between the pump chamber 16 and the filtration units 8. A water pump 24, the purpose of which will be hereinafter described, is provided in the bottom of the pump chamber 16. The oversized bottom housing panel 5 extends radially outwardly from the pump housing 23 and typically terminates beyond each filtration unit 8, to define, between the respective filtration unit covers 8a and the inside of the housing 2, a housing cover flange 29 connected to the bottom housing panel 5, and having intake openings 29a. The intake openings 29a establish communication between the outside of the housing 2 and the raw water entering the underwater filtration operator 1 through the water openings 29a (FIG. 6). The multiple intake openings 29a are positioned to receive raw water into the annular raw water chamber 17. The pump housing 23 extends upwardly through the top housing panel 4 of the housing 2 and is typically closed by a removable top plate 30. A filtered water discharge pipe 26, provided in fluid communication with the discharge of the water pump 24, extends upwardly from the water pump 24, through the pump chamber 16 and through an air-sealed opening (not illustrated) provided in the plate 30, to a filtered water discharge storage facility or the like (not illustrated). A filtered water discharge valve 18 (FIG. 2) and a pressure gauge 14 is typically provided in the filtered water discharge pipe 26. An air introduction line 31 extends to an air manifold 36 and is connected at the other end to a blower 32 or a source of compressed air (not illustrated), for selectively introducing pressurized air from the air manifold 36, into the spaced-apart, radially-oriented, peripheral air pipes 33, having air pipe openings 33 (FIG. 2) for disinfectant and combining small particles during the electrical charging process hereinafter described. An air line 36a also projects from the air manifold 36 into the housing 2 and an air line valve 36b is provided in the air line 36a. An auxiliary line 40 extends from the air line 36a and includes an auxiliary line valve 41 therein for adding selected chemicals such as disinfectants, to the system or for venting air from pump chamber 16. An auxiliary air line 37 further extends to the air manifold 36 for possible introduction of chemical disinfectants into the annular raw water chamber 17, typically through an auxiliary air valve 38, provided in the auxiliary air line 37 (FIGS. 7 and 8), as hereinafter described.

Referring again to FIGS. 7 and 8 of the drawings, multiple filtered water receiving pipes 42 extend from the water manifold 35 through openings (not illustrated) provided in the top plate 30, and into the pump housing 23 and the pump chamber 16, where they connect to the corresponding respective three-way diverters 28 in the pump chamber 16. Each of the filtered water receiving pipes 42 is fitted with a receiving pipe valve 39 for controlling the flow of water to and from the water manifold 35 as it is pumped through the respective filtered water receiving pipes 42 in the filtering and backwash cycles illustrated in FIGS. 7 and 8, respectively, as hereinafter described.

Figure 9:
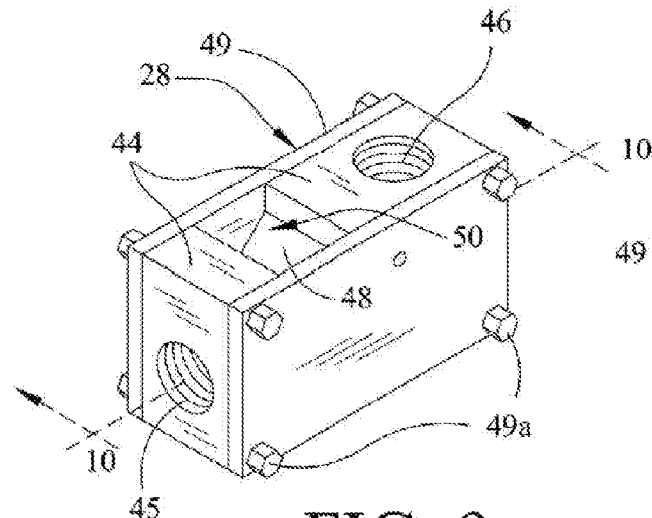
FIG. 9 is a perspective view of a three-way diverter element for determining the direction of filtered water flow in the underwater filtration system illustrated in FIGS. 2-8.
Figure 10:
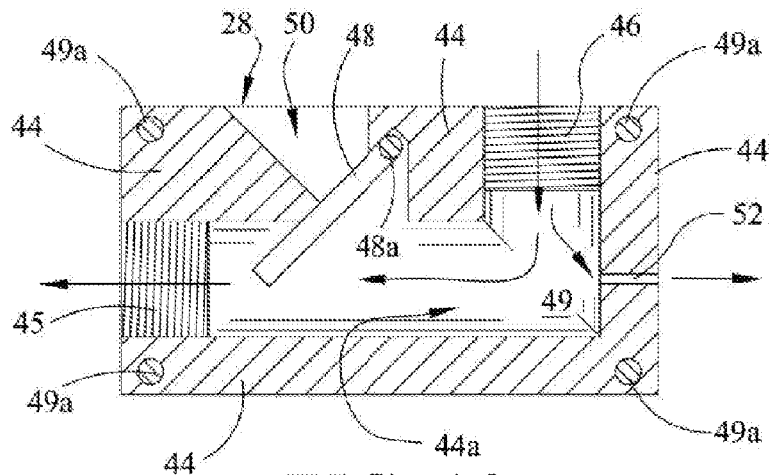
FIG. 10 is a sectional view, taken along section lines 10-10 of the 3-way diverter element illustrated in FIG. 9, with the diverter in backwash configuration.
Figure 11:
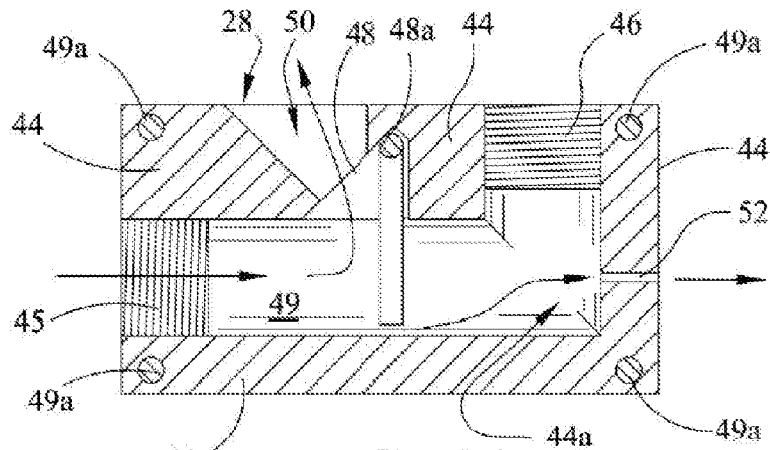
FIG. 11 is a sectional view, also taken along section lines 10-10 illustrated in FIG. 9, with the diverter in filtering configuration.

As illustrated in FIGS. 9-11 of the drawings, each of the three-way diverters 28, located in the pump chamber 16, is typically characterized by a diverter housing 44, provided with a horizontal pipe fitting 45 and a vertical pipe fitting 46, each of which interfaces with a housing interior 44a. A diverter 48 is pivotally attached to the diverter housing 44 in the housing interior 44a by means of a diverter pin 48a, as further illustrated in FIGS. 10 and 11 and the diverter pin 48a is able to swing from a first position illustrated in FIG. 10 to the second position illustrated in FIG. 11, responsive to water flow through the housing interior 44a, as hereinafter further described. Housing plates 49 serve to close the open sides of the diverter housing 44, typically using plate bolts 49a, as further illustrated in FIGS. 9-11. A flow opening 50 is provided in the top portion of the diverter housing 44 for accommodating a flow of water flowing from the housing interior 44a responsive to the position of the diverter 40a illustrated in FIG. 11, as hereinafter further described. A small bypass opening 52 is also provided in the housing 44 and communicates with the housing interior 44a (FIG. 11).

Figure 7:
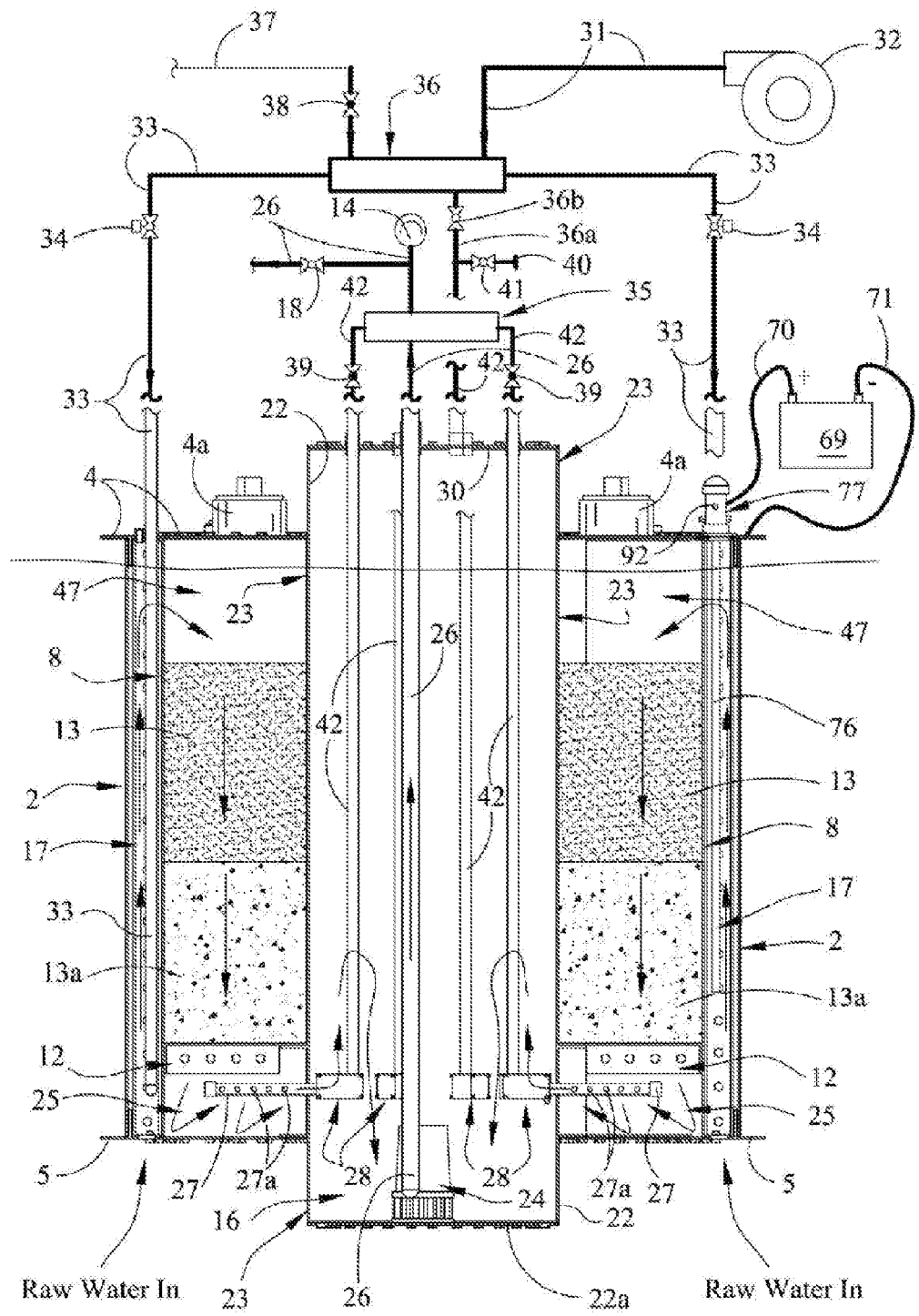
FIG. 7 is a longitudinal sectional view and schematic of the underwater filtration operator illustrated in FIG. 1, with the system disposed in filtration sequence.

Referring now to FIGS. 1-4, 7 and 8-11 of the drawings, in typical operation of the underwater filtration operator 1, the filtered water discharge tube 26 is connected to a suitable water collection container or dispenser (not illustrated) and the air introduction tube 31 is connected to a blower 32 or alternative source of pressurized air (not illustrated). Appropriate electrical connections (not illustrated) are also made to facilitate operation of the water pump 24. The housing 2 is placed in the water body 43 such that the housing 2 initially floats on the water body 43 due to the buoyancy of the housing flotation collar 20, as illustrated in FIG. 1. Accordingly, the bottom of the housing 2 is normally suspended just beneath the surface of the water body 43, as illustrated in FIG. 1, typically by means of buoyancy imparted to the housing 2 by means of the housing flotation collar 20. As the housing 2 floats on the water body 43, raw water from the water body 43 is drawn first into the annular raw water chamber 17 adjacent to each filtration unit 8, through the respective raw water intake openings 29a located in the bottom housing panel 5 or cover flange 29 (FIGS. 2-4 and 6) of the housing 2, by operation of the water pump 24. The raw water then flows through the respective filtration screens 7 (FIG. 2) in the corresponding filtration unit covers 8a and downwardly, through the top filter medium 13 and the bottom filter medium 13a, and finally as filtrate, through the respective diffuser pipe openings 27a in the diffuser pipes 27 extending into the corresponding filtration unit 8. From the diffuser pipes 27, the filtered water flows into the horizontal pipe fitting 45 and the housing interior 44a of the respective 3-way diverters 28, where it is directed upwardly through the open flow opening 50, into the pump chamber 16, by operation of the pivoting diverter 48 (FIG. 11). The water pump 24 pumps the filtered water in the pump chamber 16 upwardly through the filtered water discharge tube 26 into the water manifold 35 and through the open filtered water discharge valve 18, and finally, into a filtered water collection tank or dispenser to an additional treatment facility such as a reverse-osmosis unit (not illustrated). Accordingly, operation of the water pump 24 facilitates a continuous flow of the water from the water body 43 into the annular raw water chamber 17, through the respective filtration screens 7 in the corresponding filtration unit covers 8a of the filtration units 8 and through the top filter medium 13, the bottom filter medium 13a, the diffuser pipes 27 and the corresponding diverters 48, into the pump water chamber 16. In conjunction with the pumping process, the blower 32 is operated simultaneously therewith and air is caused to flow into the air manifold 36, through the opened air pipe valves 34 and the peripheral air pipes 33, having air pipe openings 33a and into the annular raw water chambers 17 (FIG. 7).

Figure 8:
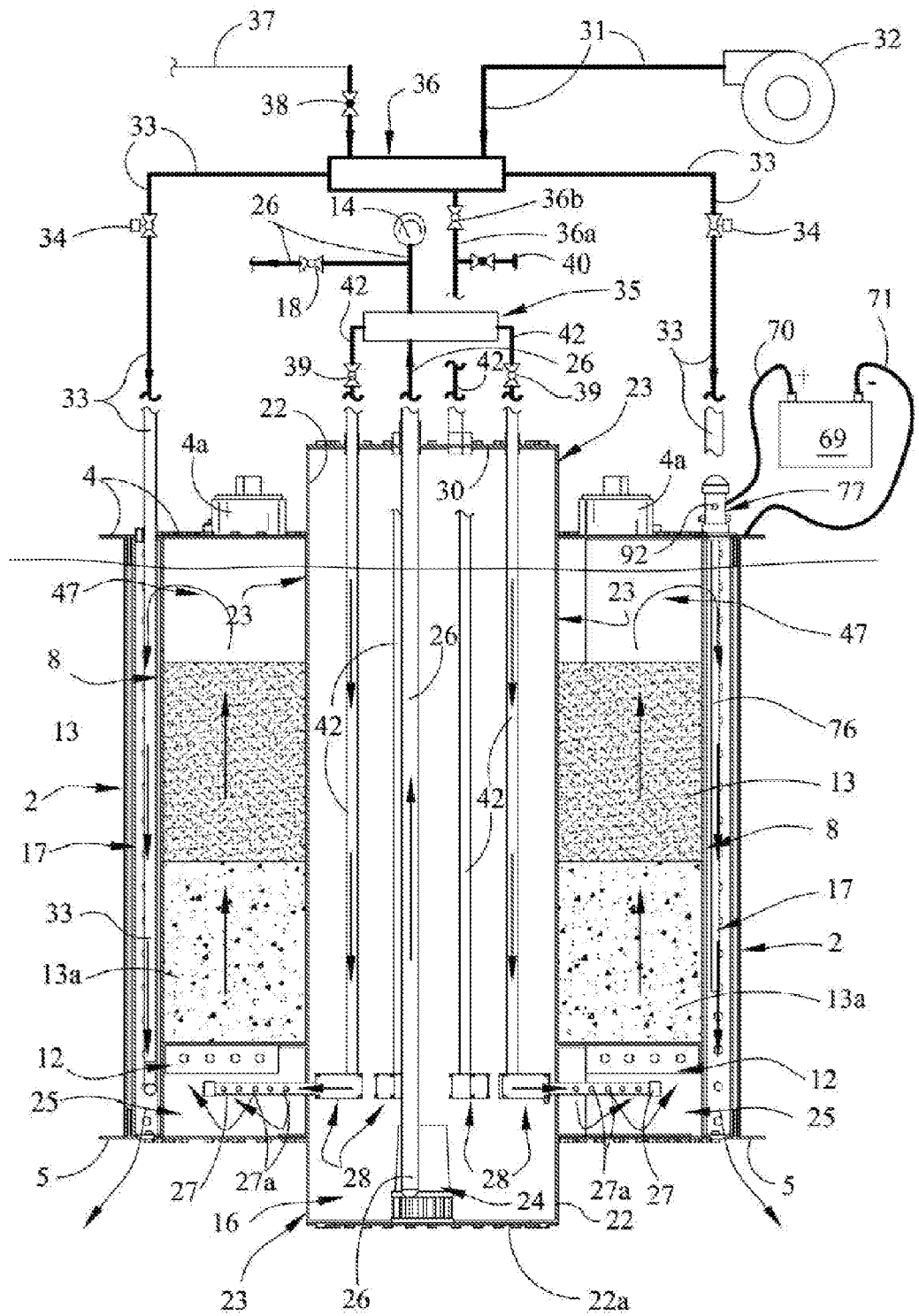
FIG. 8 is a longitudinal sectional view and schematic of the underwater filter operator illustrated in FIG. 1, with the system disposed in backwash sequence.

If all of the filtration units 8 are to be backwashed simultaneously, the filtered water discharge valve 18 is closed, the receiving pipe valves 39 opened and filtered water is pumped from an external source through the water manifold 35 and into the filtered water receiving pipes 42, as illustrated in FIG. 8, using an auxiliary water intake line (not illustrated) connected to the water manifold 35 and an external source of water. If only selected ones of the filtration units 8 are to be backwashed, the corresponding receiving pipe valves 39 are opened and the filtered water discharge valve 18 remains open. Selective backwash with filtered water production is thereby achieved. In both cases, as the water flows in reverse through the 3-way diverters 28 (FIG. 10) and the diffuser pipe openings 27a and top filter medium 13 and the bottom filter medium 13a, the top filter medium 13 and the bottom filter medium 13a are cleared of both large and small particulate impurities, as well as some bacteria and microorganisms. It will be appreciated by those skilled in the art that as the water flows through the selected filtration units 8 in this reverse, backwash mode, the water flowing into the respective filtration units 8 helps to "fluidize" the top filter medium 13 and bottom filter medium 13a, to expand the media into the respective air spaces 47 and effect a more complete cleansing of the medium. Furthermore, chlorine or other disinfectant chemicals can be introduced into the pre-filtered water through the auxiliary air line 37 and the air pipe openings 33a of the peripheral air pipes 33 by opening the auxiliary air line valve 38 in selected raw water chambers 17, to kill bacteria, algae and other microorganisms and ensure filtered water containing few or no live bacteria, algae or microorganisms which may otherwise evade the filtering process. The top filter medium 13 and the bottom filter medium 13a can be added to and removed from the respective-filtration units 8, respectively, and replaced with fresh or alternative filter medium, as deemed necessary, by accessing these pie-shaped chambers through a corresponding access opening (not illustrated) communicating with the air spaces 47 and provided in the top housing panel 4, after removing the respective access caps 4a, as described above.

As further illustrated in FIGS. 7 and 8, the underwater filtration operator 1 typically includes a split, vertically-flanged housing 2, designed as illustrated in FIGS. 1-6 and fitted with an extended top housing panel 4 that projects beyond the curved outer surface of the housing 2. In a preferred embodiment the positive charge introducing unit 75 (see below) is positively charged with electricity by means of a positive lead 70 that connects to battery charger or battery 69, and a negative lead 71, connected to the top housing panel 4, for reasons more particularly hereinafter set forth. Insulation (not illustrated) is provided to electrically isolate and insulate the unit 75 from the remainder of the underwater filtration operator 1. More specifically, in a preferred embodiment of the invention the cylindrically-shaped housing 2 is characterized by a pair of semi-cylindrically-shaped plates 2a, each having longitudinal cylinder flanges 2b, with spaced-apart flange openings 3 (FIG. 2) for bolting together using flange bolts 2c and nuts (not illustrated) to enclose the respective filtration units 8, as illustrated.

Referring now to FIGS. 12 to 15, illustrated is a unit for introducing a positive charge into raw water contained in the outermost raw water chambers 17 (FIGS. 7 and 8). This unit will hereinafter be referred to as a positive molecular dissemination bar assembly, and is indicated generally by the reference numeral 75 (see FIG. 15).

Each unit 75, or positive charge introducing unit, is mounted on the top housing panel 4 above a respective raw water chamber 17. The unit 75 includes a bar 76 for immersion in raw water, with the bar 76 preferably being made of stainless steel or any other suitable material. To effect the introduction of a positive charge into the raw water contained in the raw water chamber 17, the bars 76, which can also be referred to as positive molecular dissemination bars, are adapted to be positively charged, as will be discussed in greater detail subsequently. To hold the bar 76 in place in the raw water chamber 17, a support or mounting mechanism 77 is provided (see FIGS. 13 to 15). This support mechanism 77 includes a holder 78 for securing the bar 76. In the illustrated embodiment, securement of the bar 76 to the holder 78 is effected by a bolt 80 that is placed through a first bore 81 in the holder 78, then through a bore 82 in the bar 76, and finally through a second bore 83 in the holder 78 that is aligned with the first bore 81 thereof. To hold the bolt 80 in place, a nut 84 is threaded thereon.

Figures 13, 14:
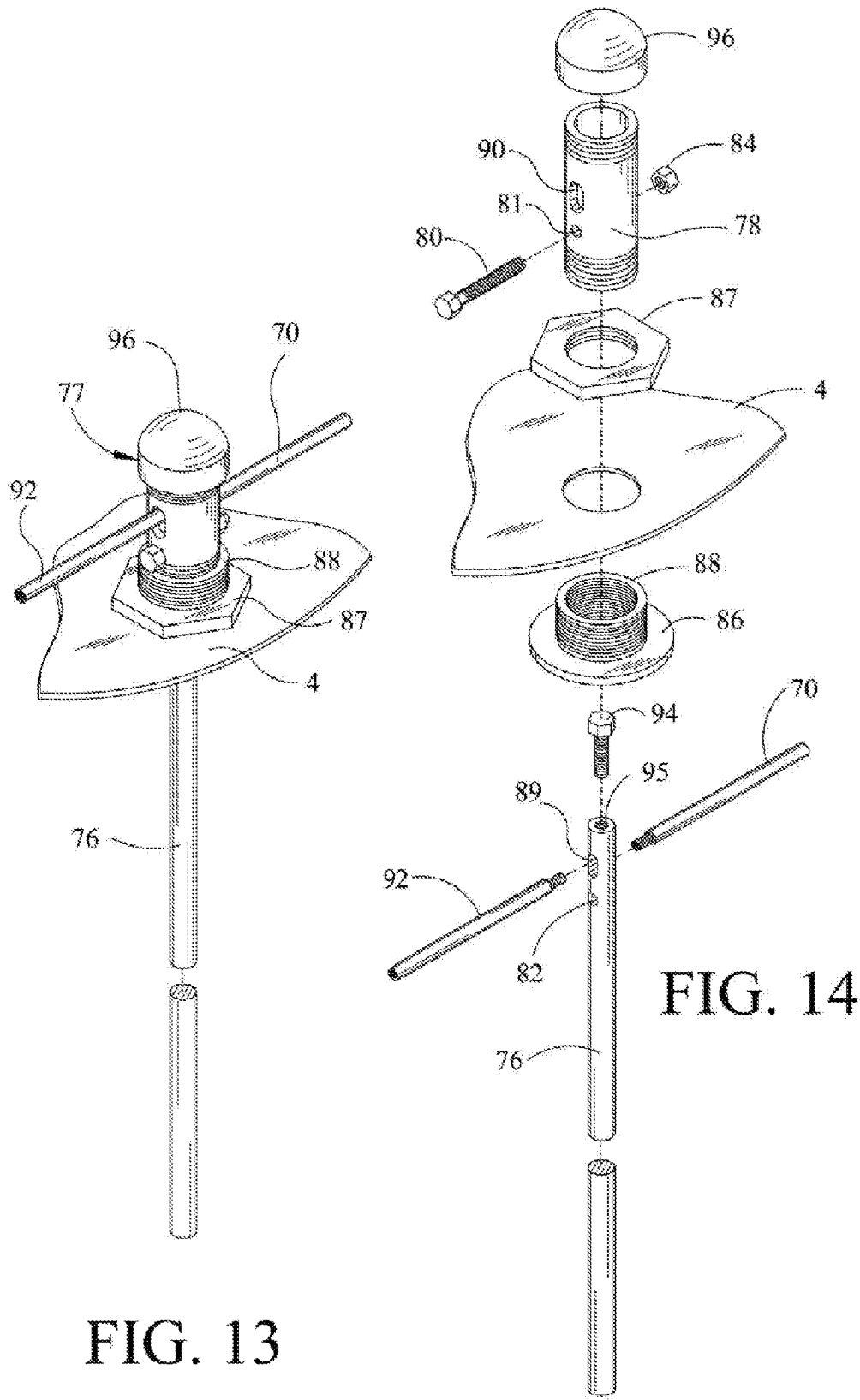
FIG. 13 shows the positive charge introduction unit in place on the top housing panel.
FIG. 14 is an exploded view of the positive charge introduction unit of FIG. 13.
Figure 15:
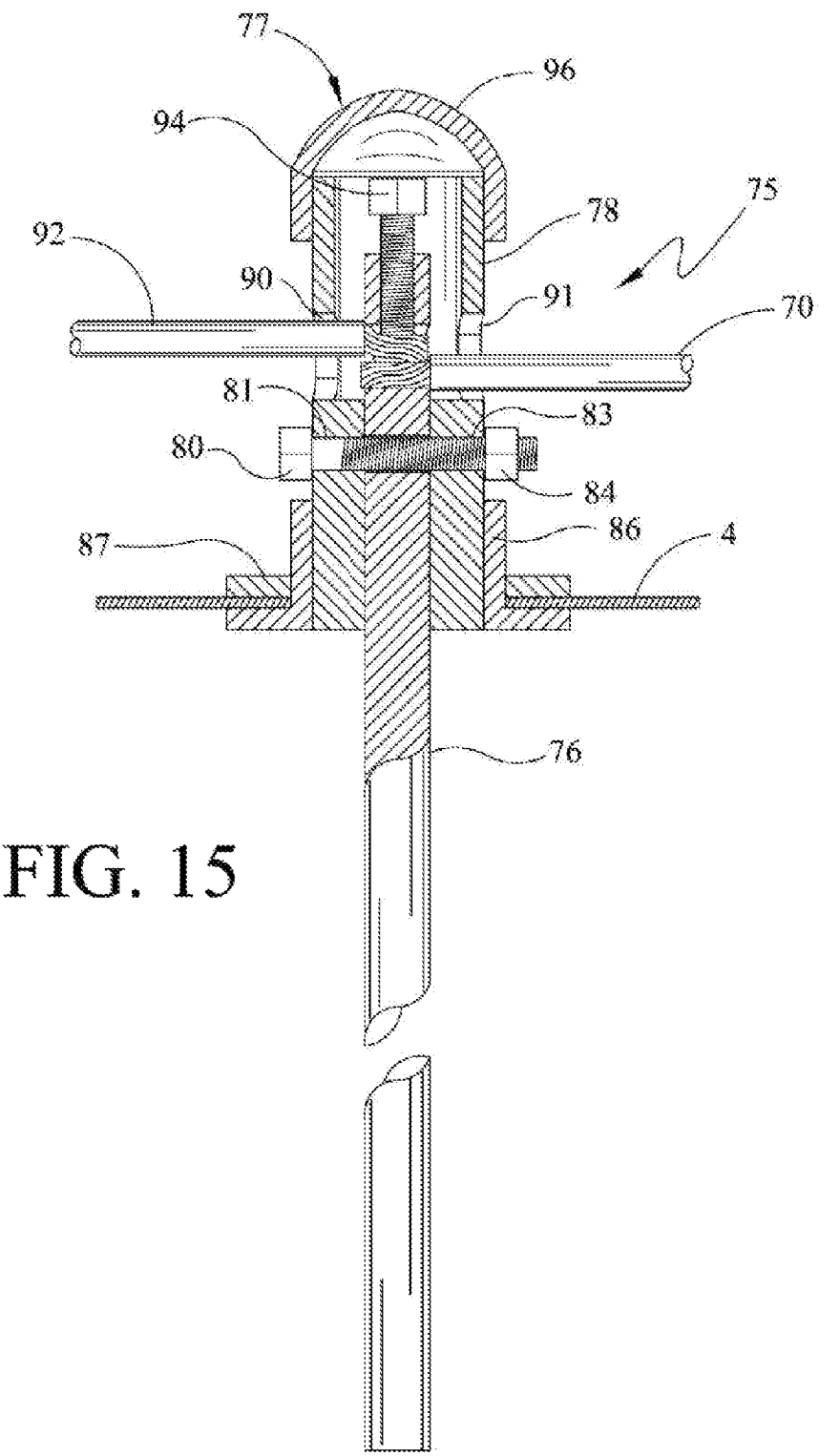
FIG. 15 is a cross-sectional view of the positive charge introducing unit of FIG. 13.

To hold the holder 78, and hence the bar 76, in place on the housing panel 4, a bulkhead fitting or similar member 86 has a flange thereof disposed on the underside of the panel 4, i.e. on the side of the panel 4 that faces the raw water chamber 17, with an internally and externally threaded portion 88 extending through a bore in the panel 4 (FIG. 14). The holder 78 is then threaded into, or alternatively onto, the bulkhead fitting 86. In the illustrated embodiment, at least the bottom "half" of the holder 78 has a substantially solid cross-section with a bore for receiving the rod 76 in a close, supporting manner. Therefore, in this embodiment the holder 78 is threaded into the bulkhead fitting 86. An additional, optional retaining member 87, here in the form of a hex nut, can be threaded onto the external threads of the projection 88 on that side of the panel 4 opposite the flange of the bulkhead fitting 86.

The bar 76 is provided with a slot 89 that, when the bar 76 is secured in place in the holder 78, is adapted to be aligned with two aligned slots 90 and 91 of the holder 78. A stripped portion of the positive lead 70 coming from the battery or charger 69 is introduced through one of the slots 90, 91 in the holder 78, and in the illustrated embodiment through the slot 91, and into the slot 89 of the bar 76 for electrical contact with the bar 76. A stripped portion of a further connecting lead 92 extends through the other slot 90 of the holder 78 and into the slot 89 of the bar 76 for electrical contact with the bar 76 and/or the positive lead 70. This lead 92 proceeds from the positive charge introducing unit 75 in question to a subsequent unit 75. If the unit 75 in question is not the one connected to the charger 69, such as a DC power supply, then both of the leads can be leads 92 that interconnect the unit 75 to other units. To secure the leads 70 and 92 in place in the slot 89 of the bar 76, a screw or bolt 94 is threaded into a threaded bore 95 that is provided in the end of the bar 76 and communicates with the slot 89. The bolt 94 is then tightened appropriately. A cap 96 is expediently disposed on the open end of the holder 78, for example by being threaded onto the holder 78, to prevent water from splashing into the holder 78 and hence possibly short-circuiting the unit.

Figure 12:
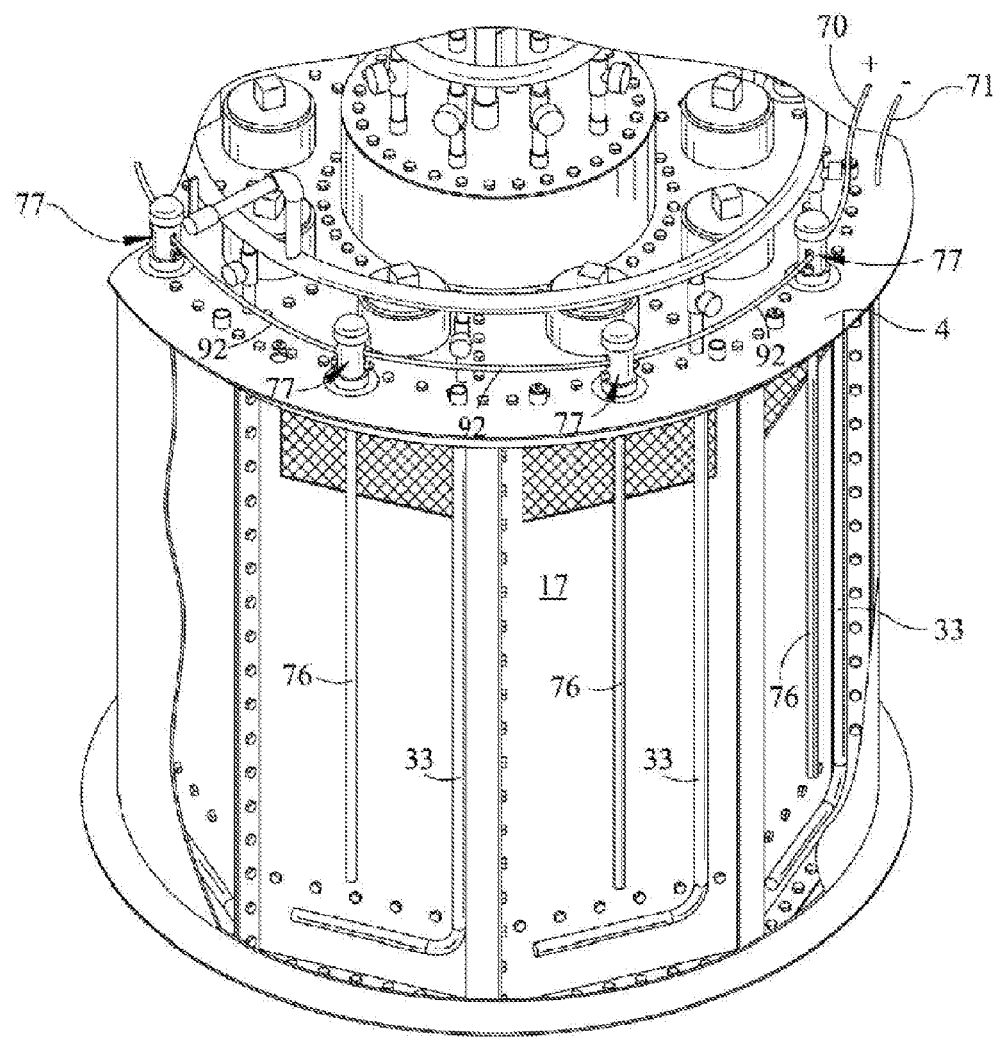
FIG. 12 is a perspective view, with the housing element removed, of a further exemplary embodiment of the underwater filtration operator of the present application.

Although in, for example, FIG. 12 only a single bar 76, and hence positive charge introducing unit 75, is illustrated, it is to be understood that any number of bars 76 and units 75 can be provided for each raw water chamber 17. The bars 76 are uniformly distributed in their respective raw water chambers 17, and if only a single bar 76 is provided per chamber 17, it is preferably centered in the chamber as illustrated in FIG. 12.

As an alternative to the above-described securement of the bar 76 to the holder 78 via the bolt 80, the holder 78 can have a closed or solid end with a threaded bore into which the bar 76 is threaded until the slot 89 thereof is disposed within the holder 78 in alignment with the slots 90 and 91 thereof. A cap 96 would again be provided to cover the bolt 94. As a further securement alternative to the bolt 80, a so-called "spring pin" or a pressed-in, non-metallic pin could be used.

It should be noted that positively charged molecular particles from the bar 76 will disseminate or dissolve over time in the raw water in the chamber 17, and the bar 76 will eventually have to be replaced. In contrast to the situation faced in prior art devices, it is an easy matter to change out the bar 76 of the present invention. In particular, it is merely necessary to pull the bar 76 up through the holder 78, or to loosen the holder 78 from the bulkhead fitting 86.

Although the bar 76 has been shown and described as a cylindrical, stainless steel bar, any other electrically conducting material can be used for the bar 76, and other suitable shapes, such as hexagonal or octagonal, can also be utilized that provide a large surface area.

Furthermore, although in FIGS. 1 and 2 the split housing 2 is shown as being substantially round or cylindrical, the housing can preferably actually conform to the, e.g. octagonal or hexagonal, shape of the inner overall filtration unit assembly comprised of the filtration units 8. In such a case, the top and bottom housing panels 4 and 5 will have corresponding shapes.

To prevent short circuiting or arcing between the bars 76 and the air pipes 33 in the raw water chambers 17, the air pipes can be made of PVC. Alternatively, non-conducting spacers could also be disposed between the bars 76 and the air pipes 33.

To electrically insulate the bars 76 from the panel 4, which is connected via the lead 71 to the negative terminal of the power supply 69, the components of the support mechanism 77 should preferably be made of a non-conducting, insulating material, such as the acetal resin sold under the trademark Delrin.

Referring again to FIGS. 7, 8 and 12, the positive lead 70 of the battery charger 69, such as a DC power supply, can be attached to the unit 75, while the negative lead 71 of the battery or the battery charger 69 is attached to the top housing panel 4 to facilitate applying an electrical potential to the top filter medium 13 and the bottom filter medium 13a. Accordingly, since raw water flowing from the water body 43 into the interior of the underwater filtration operator 1 through the raw water intake openings 29a contains negatively charged particles as impurities, these particles are neutralized as they contact the positively charged surface of the bar 76 and are therefore more effectively and efficiently filtered through filter medium. The introduction of forced air from the air blower 32 through the peripheral air pipes 33, and the air pipe openings 33a, into selected raw water chambers 17 aids the charging process of the particles entering the selected raw water chambers 17. Consequently, creating a positive electrical charge on the incoming particles of sand, grit, clay and the like in the raw intake water, prevents these particles from being repelled by each other and facilitates a more effective filtration and coalescing of the particles together in the top filter medium 13 and the bottom filter medium 13a. The result of the more efficient filtration is exceptionally clear water which enters the pump chamber 16 and is pumped by means of the water pump 24 from the pump chamber 16 of the water filtration system 1, to storage, use or to an additional water treatment filter unit, such as a reverse osmosis unit, as desired.

It will be appreciated by those skilled in the art that as heretofore described, the underwater filtration operator 1 of this invention can be selectively operated in a backwash cycle without the use of an external clear water storage tank to remove impurities, filtered from the water, from the top filter medium 13 and the bottom filter medium 13a, respectively, by reversing the direction of water flow through the respective filtration units 8 individually or in any desired combination. This is accomplished as described in detail above by opening the respective receiving pipe valves 39 of the respective filtered water receiving pipes 42 that serve the filtration units 8 to be backwashed and pumping filtered water from the pump chamber 16, through the filtered water receiving pipes 42. This action, illustrated in FIG. 8, forces the filtered water in the pump chamber 16 upwardly through the bottom filter medium 13a and the top filter medium 13 in the respective filtration units 8 and into the raw water chamber 17. The reverse flow of water through the bottom filter medium 13a and the top filter medium 13, respectively, of each filtration unit 8, as described above, removes all or most of the filtered particles and some microorganisms from the top filter medium 13 and the bottom filter medium 13a of each filtration unit 8, and directs these impurities back into the water body 43. Furthermore, when the water is forced through the bottom filter medium 13a and the top filter medium 13, the air space 47 in each of the filtration units 8 enables the top filter medium 13 and the bottom filter medium 13a to expand and fill the entire volume of the respective inner filtration units 8. Accordingly, the top filter medium 13 and bottom filter medium 13a become fluid in the filtration units 8, respectively, and this facilitates a thorough cleansing of the top filter medium 13 and bottom filter medium 13a.

Referring again to FIG. 1 of the drawings, it will be appreciated by those skilled in the art that the housing flotation collar 20 is particularly suitable for suspending the housing 2 beneath the surface of the water body 43 under circumstances in which the level of the water body 43 is subject to fluctuation. Alternatively, it is understood that the housing 2 can be positioned beneath the surface of the water body 43 by securing the housing 2 to a dock, barge, piling or the like (not illustrated). It will be further appreciated by those skilled in the art that the controls for the various valves, both air and water, may be provided in a land-based control panel (not illustrated) for convenient, expedient and/or automated operation of the underwater filtration operator 1. Furthermore, it is also understood that any source of direct electric current, in addition to a battery charger, can be used to supply the desired potential across the filter media.

A further embodiment of applicant's filtration operator relates to a "non-floating" model that, in contrast to the previously described "floating" model, can be used in a building, can be placed on a trailer for portable applications, can be set up on the bank of a body of water, where it can be connected to a small floating intake where water levels are too shallow to float a larger unit, or can be used in any other application where it is not practicable to use a floating model.

One exemplary embodiment of applicant's "non-floating" model is designated generally by the reference numeral 1a, and components thereof are illustrated in FIGS. 16-20. Those structural elements that are not discussed separately have the same reference numeral as utilized in conjunction with the previously described embodiment, and function essentially the same as previously described.

Figure 16:
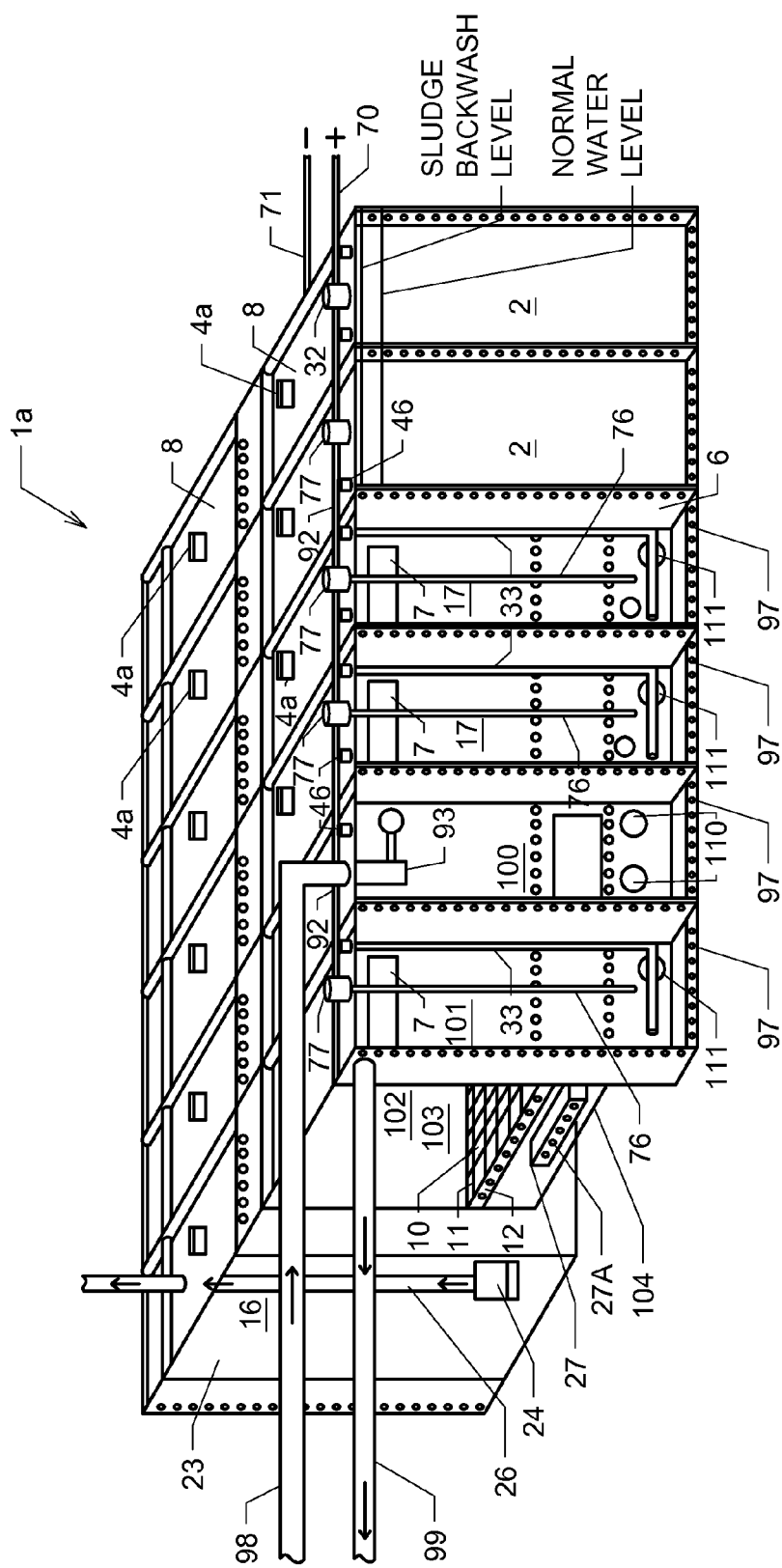
FIG. 16 is a perspective view of an exemplary embodiment of a non-floating filtration system of this invention having a separate, common raw water reservoir that serves all of the filtration units.

As can be seen in FIG. 16, the filtration operator 1a again comprises a plurality of filtration units 8, although rather than being, for example, pie shaped so as to fit together to form a cylindrical filtration operator, the filtration units 8 of the present model are independent, preferably rectangular, units that can be placed together in any desired number to form a filtration operator having the desired filtering capacity; in the illustrated embodiment, nine filtration units 8 are provided. It is to be understood that the filtration units 8 can have any desired shape and size. Each filtration unit 8 has associated with it a respective raw water chamber 17, which is closed off by an outer housing panel 2, and which is supplied with raw water in a manner to be described subsequently.

As can be seen in FIG. 16, raw water is supplied to the filtration operator 1a via the raw water inlet pipe 98. However, rather than being supplied directly to the raw water chambers 17 of each of the filtration units 8, as was the case with the previously described filtration operator 1, in the present model the raw water inlet pipe 98 first conveys raw water to a separate raw water reservoir 100, which, as do the filtration units 8, has a solid outer chamber bottom 97. To maintain the proper level of raw water in the raw water reservoir 100, and hence in the filtration units 8, a float valve 93 is provided in the raw water reservoir 100 (see also "water level" indications at the right side of FIG. 16 and in the left-hand filtration unit 8 of FIG. 17).

Figure 17:
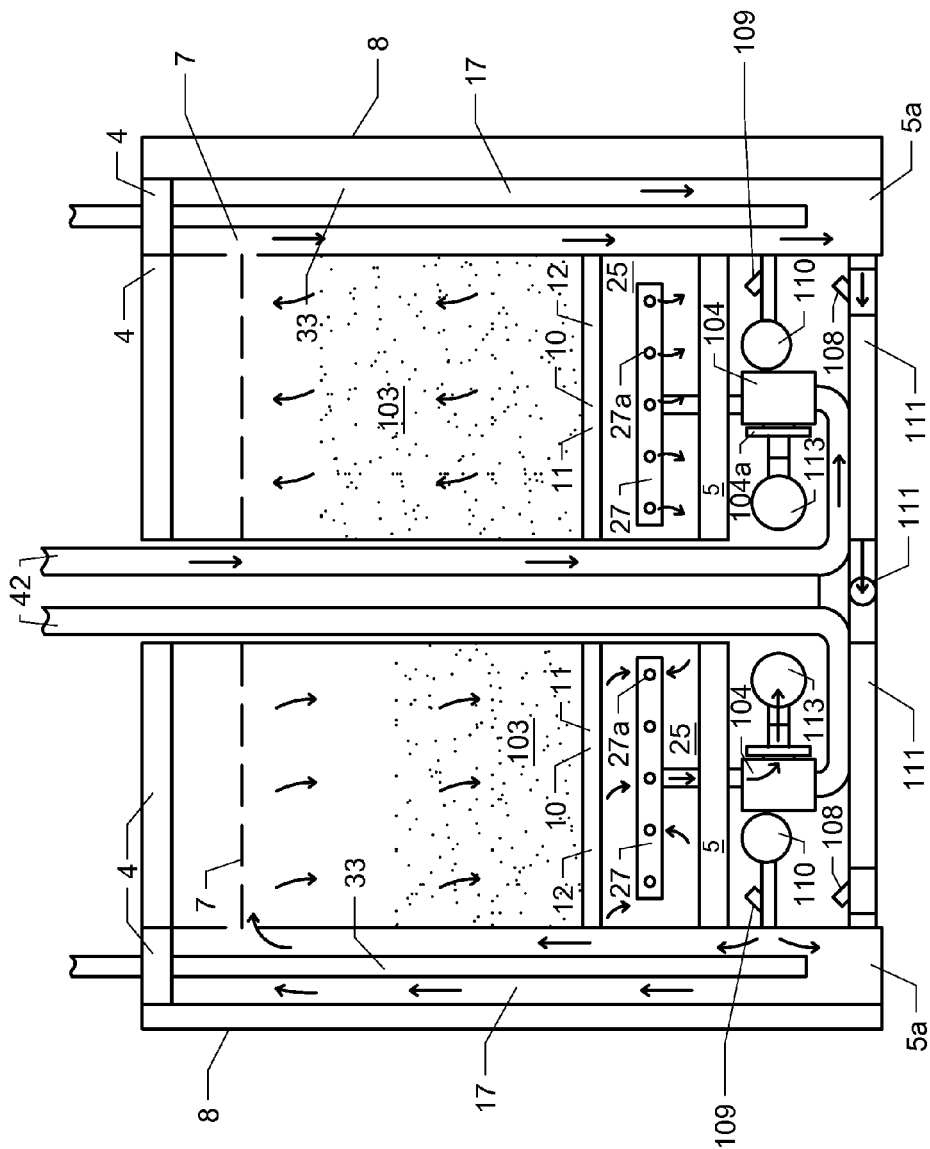
FIG. 17 end views of two of the filtration units, one in a filtration mode, and the other in a backwash mode.
Figure 18:
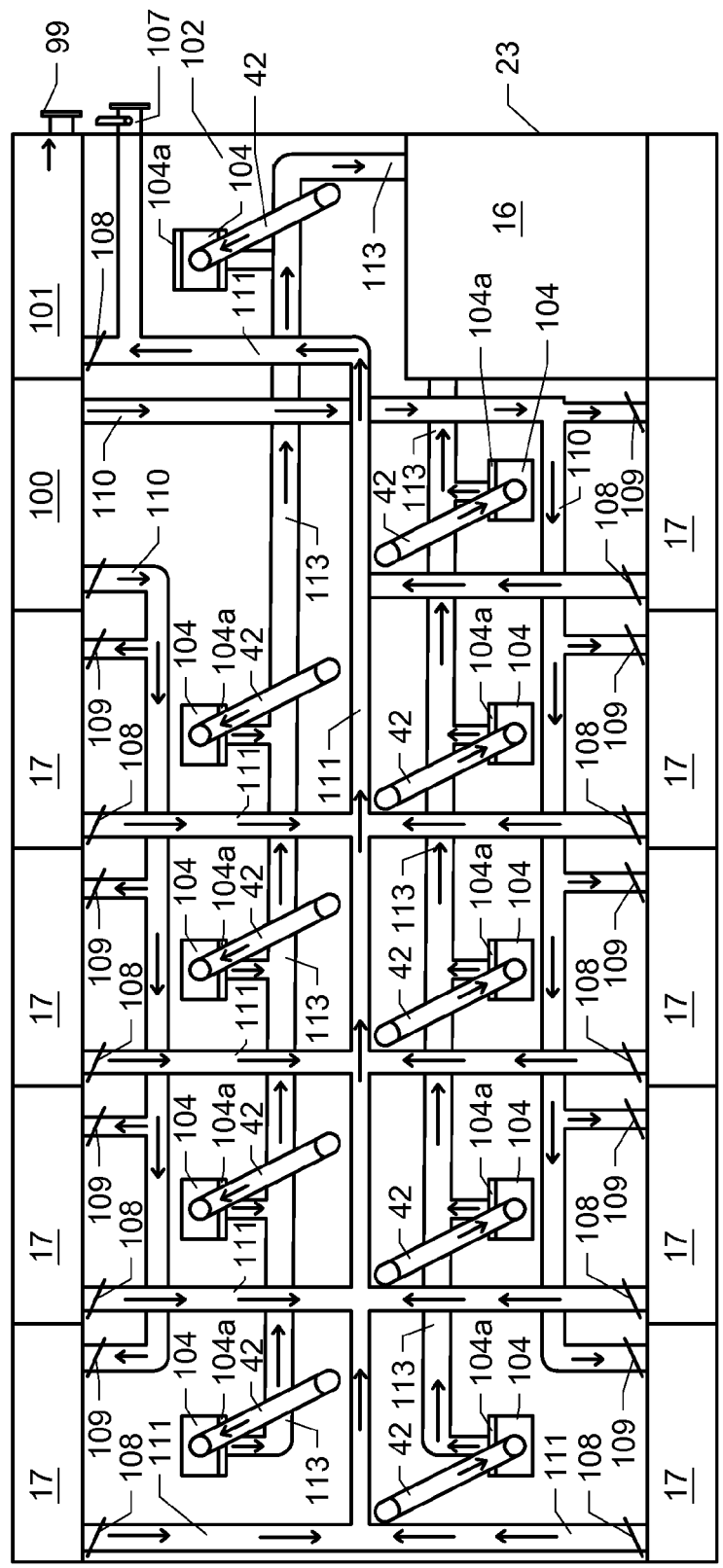
FIG. 18 schematically illustrates the flow scheme of the filtration system illustrated in FIG. 16.

From the raw water reservoir 100, raw water is supplied via the raw water manifolds 110 to the individual raw water chambers 17 of the filtration units 8 (see FIG. 18). In filtration mode, the raw water check valve 109 (see the left-hand filtration unit 8 in FIG. 17) is open to allow raw water to enter the raw water chamber 17. As in the previously described embodiment, air is caused to enter the raw water chambers 17 through openings provided in the air pipes 33 (see also FIG. 3). In addition, to here also effect the introduction of a positive charge into the raw water contained in the raw water chambers 17, at least one positive molecular dissemination bar 76 is disposed in each raw water chamber 17, and also in the outer sludge recycle chamber 101, which will be discussed in greater detail subsequently.

As in the previously described embodiment, raw water again flows from the raw water chamber 17 through a filtration screen 7 located in the upper portion of the partition between the raw water chamber 17 and the actual filtering chamber of the filtration unit 8 to be able to flow through the filter medium in the filtering chamber. In the present embodiment, rather than having the dual filter medium arrangement 13, 13a a special ionic amorphous chromite medium 103 is provided in the filtering chamber of a the filtering unit 8, as will be described in greater detail subsequently. After the raw water has flowed downwardly through the filtering medium 103, the filtered water exiting therefrom flows through the screen grid frame 12, which can again be comprised of a sieve screen 11 that is sandwiched between a pair of metal screens 10.

As shown in FIG. 17, from the screen grid frame 12 the filtered water enters the diffuser pipes 27 and from there is conveyed to a diverter valve, or simply diverter, 104, which will be discussed in greater detail subsequently. From the diverter 104, the filtered water flows via a filtered water manifold 113 to the pump chamber 16, from where the water is pumped by the pump 24, through the filtered water discharge pipe 26, for storage in a tank or similar facility (see also FIGS. 16 and 18).

To backwash a given filtering chamber of a filtration unit 8, namely to revitalize the filter medium 103 contained therein, pressurized water from the water manifold 35 is released through the receiving pipe valve 39 (FIG. 2), flowing water through the receiving pipes 42 into the diverter valve 104 forcing the swing plate 106 (FIG. 20) to close, diverting water through the diffuser pipes 27 and into the filtering chamber of the filtration unit 8, where this water now flows upwardly through the filter medium 103, raising the water level above the normal level of water in a filtration unit 8 during a filtration mode (see the right-hand filtration unit 8 shown in FIG. 17 in backwash mode). Note that the weight of the higher water level in the filtration unit can actually be utilized to accomplish closing of the raw water check valve 109. In addition, a sludge check valve 108, which was closed when the filtration unit 8 was in filtration mode, is now opened, again, pursuant to one advantageous embodiment of the invention, by utilizing the weight of the higher water level in the filtration unit.

As shown by the arrow near the top of the filtration unit 8 that is being backwashed, the sludge flows out through the opening or screen 7 and into the raw water chamber 17. The sludge or backwash sludge water then flows downwardly in the chamber 17, through the open sludge check valve 108, through the sludge manifold 111 and through the opened sludge chamber check valve 105 into one or more sludge recycle outer chambers 101 (FIGS. 16-18). It should be noted that each of the sludge recycle chambers 101 is also provided with air pipes 33 and at least one positive molecular dissemination bar 76.

As the sludge water continues to enter the sludge recycle chamber 101, the sludge water level will continue to rise until it reaches the screen 7, at which time it will enter the sludge recycle filter chamber 102. The sludge water is then filtered by the filter medium 103 (see in particular the cut-away sludge recycle filter chamber 102 depicted in FIG. 16). Water filtered by the medium 103 flows through the screens 10 and 11 of the screen grid frame 12, through the diffuser holes 27a and the diffuser 27, through the diverter valve body 104, from where it enters the filtered water manifold 113 and flows into the pump chamber 16. When all of the other filter units 8 have been backwashed and recycling of the sludge water in the sludge recycle filter chamber 102 is complete, or has timed out, backwash of this chamber begins. To accomplish backwash, water from the water manifold 35 is released by opening the receiving pipe valve 39 (FIG. 2), allowing water to flow through respective filtered water receiving pipes 42 into the filter chamber 102. Water rising in the chamber 102 is advantageously used to cause the sludge chamber check valve 105 (FIG. 18), which was previously opened to allow the sludge being conveyed in the sludge manifold 111 to enter the sludge recycle chamber 101, to close, whereupon backwashed sludge water is diverted out through the sludge out drain pipe 99 (FIGS. 16 and 18). As can be seen in FIG. 16, the bottom edge of the sludge out drain pipe 99 is disposed slightly higher than the "normal" water level in the other filter chambers of the filtration units 8, which water level is regulated by the float valve 93. Such an arrangement allows most of the sludge water to be recycled, with any excess flowing out through the sludge out drain pipe 99.

It should be emphasized that while backwash is occurring in one or more of the filtration units 8, the remaining filtration units continue to produce a flow of clean water.

Figure 19:
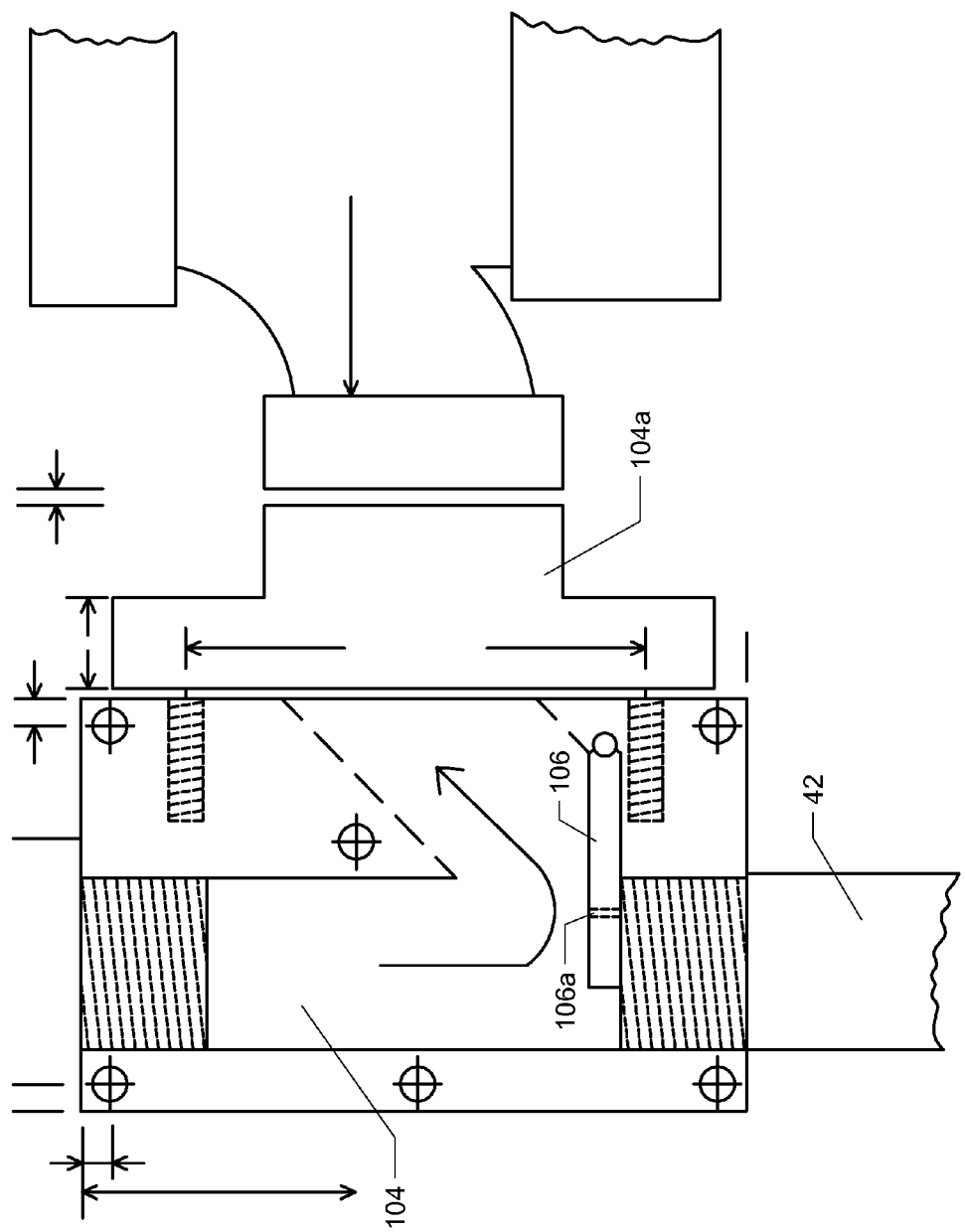
FIG. 19 schematically illustrates a diverter element for the filtration system of FIG. 16 in a filtering configuration.
Figure 20:
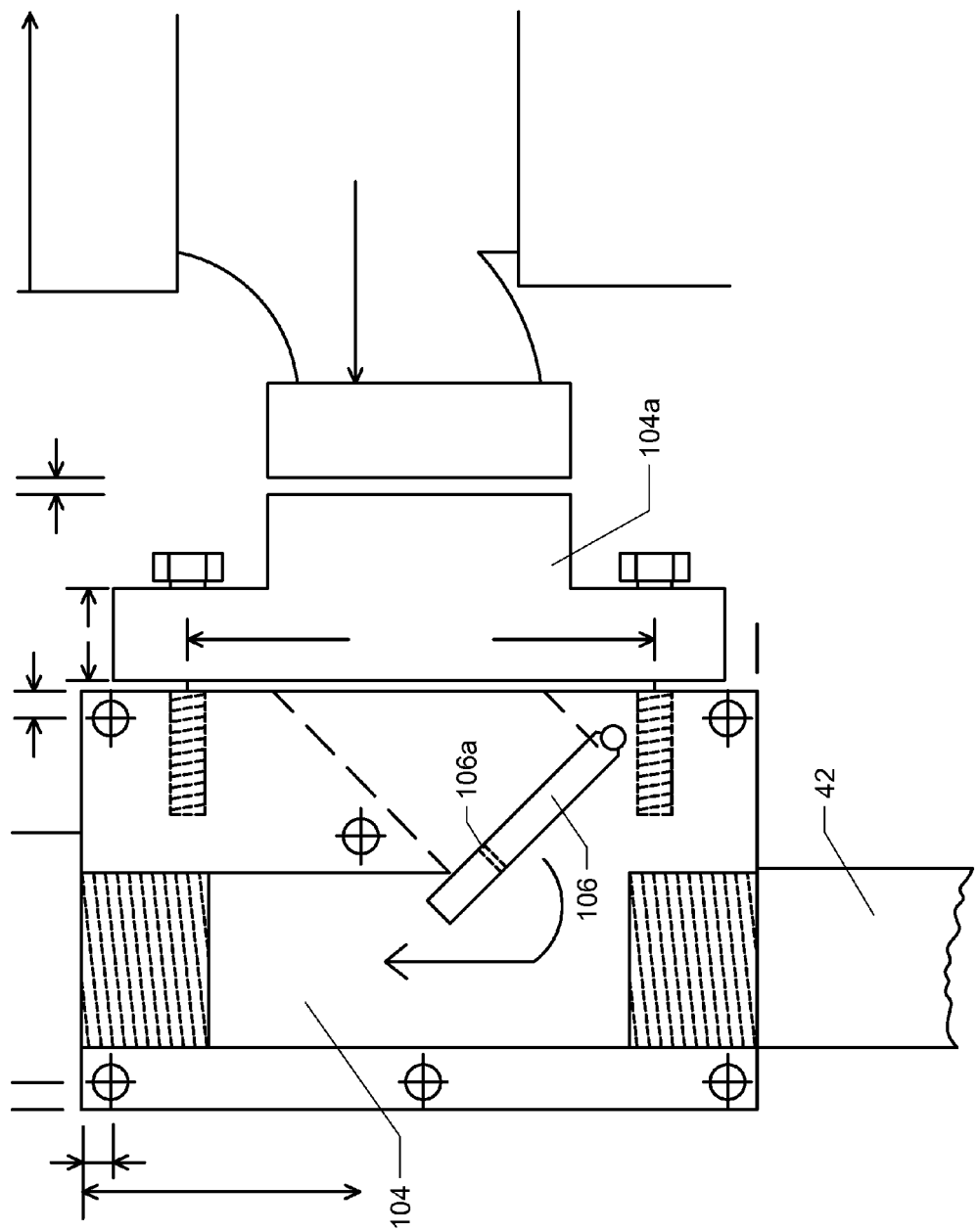
FIG. 20 schematically illustrates a diverter element for the filtration system of FIG. 16 in a backwash configuration.

The diverter valve or diverter 104 will now be explained in greater detail in conjunction with FIGS. 19 and 20. The diverter 104 is intended to be disposed in the vertical arrangement shown. FIG. 19 illustrates the position of the diverter 104 when the filtration unit 8 is in a filtering mode. In this position, a swing plate 106, for example of stainless steel, of the diverter 104 opens the channel of the diverter that leads, via an adapter 104a, to its connection to the filtered water manifold 113. The swing plate 106 is provided with one or more small holes 106a to prevent an "air lock" that could cause the swing plate to stick in a closed position. As shown in FIG. 20, for the backwash mode, the swing plate 106 is pivoted to a position where it closes off the channel that leads to the filtered water manifold 113, and opens access for receiving water from the filtered water receiving pipes 42 for a backwash flow, as indicated by the upward arrow in the diverter 104 in FIG. 20.

It should be noted that there is a normally closed electrically controlled valve on the pipe that feeds water through the diverter 104 in the backwash mode. The filtered water that is directed from the filter beds 103 through the diverters 104 is under a much lower pressure and the water cannot escape past the swing plate 106 when the electrically controlled valve is closed. When the electrically controlled valve is opened, for example by a timer or PLC in a control box, backwash water flowing through the diverter 104 is under higher pressure and causes the swing plate 106 to move upwardly into the closed position illustrated in FIG. 20, thus "diverting" almost all of the water to the filter bed during the backwash cycle With regard to the filter medium 103, this medium is identified as a special ionic amorphous chromite medium; this unique medium has a natural permanent ionic charge, which reacts with the positive current supplied by the at least one positive molecular dissemination bar 76 disposed in the raw water chambers 17 and the sludge recycle chamber 101, and with the oxygen added to these chambers via the air pipes 33. With applicant's unique filtration operator, including the filter medium 103, the filtration units 8 are now effective to trap particles that are 5 microns or less in size without the use of chemicals. It is therefore possible to provide a superior filtration at a greater flow rate than is possible with sand, and far less water is required to clean the filter medium during a backwash cycle, resulting in a higher production rate for applicant's filtration operator.

Shown on the right-hand side of FIG. 18 is a main drain valve 107, which enables the filtration operator to be drained for transport. Finally, the drawings, in particular FIG. 16, show the filtration operator as an integral unit. This is obviously the most convenient configuration for portability and in order to be able to quickly attach to a raw water source and begin filtration of the raw water. However, it would also be conceivable to provide one or more raw water reservoirs 100 that are at least in part separate from the filtration operator.

While the preferred embodiments of the invention have been described above, it will be recognized and understood that various modifications can be made in the invention and the appended claims are intended to cover all such modifications which may fall within the spirit and scope of the invention.

The invention claimed is:

1. A filtration operator for operating externally of a body of water for filtering raw water, comprising:
    a plurality of filtration units (8);
    a raw water reservoir (100);
    means for conveying raw water from said raw water reservoir (100) to individual ones of said filtration units (8);
    filter medium (103) provided in each of said filtration units (8) for filtering raw water;
    a pump chamber (16) for receiving filtered water from said filtration units (8);
    a respective raw water chamber (17) associated with each of said filtration units (8), wherein said raw water chambers (17) are configured to be in water communication with said raw water reservoir (100), said filtration units (8), and said pump chamber (16);
    a sludge filtering and recycling chamber (102) for receiving sludge from said filtration units (8) during a backwash cycle, wherein at least said filtration units (8), said raw water reservoir (100), and said sludge filtering and recycling chamber form a structural unit that is disposed externally of the body of water; and
    at least one positively charged bar (76) disposed in each of said raw water chambers (17), as well as in said sludge filtering and recycling chamber.

2. A filtration operator according to claim 1, wherein said filter medium (103) is an ionic amorphous chromite medium.

3. A filtration operator according to claim 2, wherein said filter operator is capable of trapping particles as small as 5 microns.

4. A filtration operator according to claim 1, wherein said filter medium (103) is also provided in said sludge filtering and recycling chamber (102).

5. A filtration operator according to claim 4, further including at least one sludge receiving chamber (101) associated with said sludge filtering and recycling chamber (102), wherein said sludge receiving chamber (101) is configured to be in communication with said sludge filtering and recycling chamber (102) and with said raw water chambers (17) for receiving sludge from the latter during a backwash cycle of said filtration units (8).

6. A filtration operator according to claim 5, further including means to convey sludge backwashed in said sludge filtering and recycling chamber (102) away from said sludge receiving chamber (101).

7. A filtration operator according to claim 5, wherein at least one positively charged bar (76) is also disposed in said sludge receiving chamber (101).

8. A filtration operator according to claim 5, wherein air diffuser pipes (33) are disposed in each of said raw water chambers (17) and also in said sludge receiving chamber (101).

9. A filtration operator according to claim 1, wherein said positively charged bar (76) is a positive molecular dissemination bar.

10. A filtration operator according to claim 1, wherein air diffuser pipes (33) are disposed in each of said raw water chambers.

11. A filtration operator according to claim 1, wherein each of said filtration units (8) is provided with a diverter valve (104) for receiving filtered water from said filter medium (103) and for directing water to said filter medium (103) during a backwash cycle of said filtration units (8).

12. A filtration operator according to claim 11, wherein said sludge filtering and recycling chamber (102) is also provided with a diverter valve (104) for receiving filtered sludge water during a filtering cycle of said sludge filtering and recycling chamber (102) and for directing water to said filter medium (103) during a backwash cycle of said sludge filtering and recycling chamber.

\* \* \* \* \*